United States Patent
Li et al.

(10) Patent No.: US 11,182,592 B2
(45) Date of Patent: Nov. 23, 2021

(54) TARGET OBJECT RECOGNITION METHOD AND APPARATUS, STORAGE MEDIUM, AND ELECTRONIC DEVICE

(71) Applicant: BEIJING SENSETIME TECHNOLOGY DEVELOPMENT CO., LTD., Beijing (CN)

(72) Inventors: Qixing Li, Beijing (CN); Fengwei Yu, Beijing (CN); Junjie Yan, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 20 days.

(21) Appl. No.: 16/734,336

(22) Filed: Jan. 5, 2020

(65) Prior Publication Data
US 2020/0143146 A1 May 7, 2020

Related U.S. Application Data

(63) Continuation of application No. PCT/CN2018/111513, filed on Oct. 23, 2018.

(30) Foreign Application Priority Data

Nov. 23, 2017 (CN) .......................... 201711181299.5

(51) Int. Cl.
*G06K 9/00* (2006.01)
*G06T 7/73* (2017.01)
(Continued)

(52) U.S. Cl.
CPC ....... *G06K 9/00248* (2013.01); *G06K 9/4604* (2013.01); *G06K 9/629* (2013.01);
(Continued)

(58) Field of Classification Search
CPC .... G06K 9/6232; G06K 9/629; G06K 9/4604; G06K 9/4671; G06K 9/00248;
(Continued)

(56) References Cited

U.S. PATENT DOCUMENTS

| 2010/0020224 | A1 | 1/2010 | Hattori |
| 2019/0297304 | A1* | 9/2019 | Li .......................... G06F 3/013 |
| 2020/0104568 | A1* | 4/2020 | Liang ................. G06K 9/00248 |

FOREIGN PATENT DOCUMENTS

| CN | 105205486 A | 12/2015 |
| CN | 105631439 A | 6/2016 |

(Continued)

OTHER PUBLICATIONS

Arras, Kai O., Oscar Martinez Mozos, and Wolfram Burgard. "Using boosted features for the detection of people in 2d range data." Proceedings 2007 IEEE international conference on robotics and automation. IEEE, 2007. (Year: 2007).*

(Continued)

*Primary Examiner* — Pinalben Patel
(74) *Attorney, Agent, or Firm* — Syncoda LLC; Feng Ma

(57) ABSTRACT

A target object recognition method includes: performing target object detection on an object of an image to be detected to obtain target object prediction information of the object, where the target object prediction information is confidence information that the detected object is the target object; performing key point detection on the object of the image to be detected to obtain key point prediction information of the object, where the key point prediction information is confidence information that a key point of the detected object is a key point of the target object; fusing the target object prediction information with the key point prediction information to obtain comprehensive prediction (Continued)

information of the object; and recognizing the target object according to the comprehensive prediction information.

17 Claims, 8 Drawing Sheets

(51) Int. Cl.
*G06K 9/46* (2006.01)
*G06K 9/62* (2006.01)

(52) U.S. Cl.
CPC .............. *G06K 9/6256* (2013.01); *G06T 7/73* (2017.01); *G06T 2207/10016* (2013.01); *G06T 2207/30201* (2013.01)

(58) Field of Classification Search
CPC ........... G06K 9/00281; G06K 9/00261; G06K 9/6256; G06T 2207/10016; G06T 7/73; G06T 2207/30201
See application file for complete search history.

(56) References Cited

FOREIGN PATENT DOCUMENTS

| | | | | |
|---|---|---|---|---|
| CN | 105868769 | A | | 8/2016 |
| CN | 106295567 | A | | 1/2017 |
| CN | 106485230 | A | * | 3/2017 |
| CN | 106485230 | A | | 3/2017 |
| CN | 106778585 | A | * | 5/2017 ......... G06K 9/00288 |
| CN | 106778585 | A | | 5/2017 |
| CN | 106815566 | A | | 6/2017 |
| CN | 107273845 | A | | 10/2017 |
| CN | 108229308 | A | | 6/2018 |
| JP | 2008131405 | A | | 6/2008 |
| JP | 2008257425 | A | | 10/2008 |
| JP | 2008310775 | A | | 12/2008 |
| JP | 2014505952 | A | | 3/2014 |
| JP | 2014128002 | A | | 7/2014 |
| JP | 2014178862 | A | | 9/2014 |
| KR | 1020150127381 | A | | 11/2015 |
| KR | 20160033552 | A | | 3/2016 |
| WO | 2012109712 | A1 | | 8/2012 |
| WO | 2013122009 | A1 | | 8/2013 |
| WO | 2014205768 | A1 | | 12/2014 |

OTHER PUBLICATIONS

International Search Report in the international application No. PCT/CN2018/111513, dated Jan. 16, 2019.
First Office Action of the Chinese application No. 201711181299.5, dated Nov. 29, 2019.
Second Office Action of the Chinese application No. 201711181299.5, dated Jul. 22, 2020.
English translation of the Written Opinion of the International Search Authority in the international application No. PCT/CN2018/111513, dated Jan. 16, 2019.
First Office Action of the Korea application No. 10-2020-7000574, dated Apr. 26, 2021.
First Office Action of the Japan application No. 2020-500847, dated Mar. 9, 2021.

* cited by examiner

TARGET OBJECT RECOGNITION METHOD AND APPARATUS, STORAGE MEDIUM, AND ELECTRONIC DEVICE

CROSS-REFERENCE TO RELATED APPLICATIONS

This is a continuation of International patent application No. PCT/CN2018/111513 filed on Oct. 23, 2018, which claims priority to Chinese patent application No. 201711181299.5 filed on Nov. 23, 2017. The disclosures of these applications are incorporated herein by reference in their entirety.

BACKGROUND

In general, an object recognition process includes detection and tracking, key point detection and alignment, and feature extraction. In this process, it is expected to recognize a target object as accurate as possible while reducing misjudgment at the same time. That is, the highest recognition rate and the lowest false positive rate are pursued. However, a high false positive rate still exists in target object recognition (for example, facial recognition) using the existing related technology, i.e., an expected recognition rate cannot be met.

SUMMARY

Embodiments of the present disclosure relate to, but not limited to, a computer vision technology, and in particular, to a method and an apparatus for target object recognition, a non-transitory computer readable storage medium, and an electronic device.

Embodiments of the present disclosure provide a method for target object recognition, including: performing target object detection on an object of an image to be detected to obtain target object prediction information of the object, where the target object prediction information is confidence information that the detected object is the target object; performing key point detection on the object of the image to be detected to obtain key point prediction information of the object, where the key point prediction information is confidence information that a key point of the detected object is a key point of a target object; fusing the target object prediction information with the key point prediction information to obtain comprehensive prediction information of the object; and recognizing the target object according to the comprehensive prediction information.

Embodiments of the present disclosure provide an apparatus for target object recognition, including: an object detection module, configured to perform target object detection on an object of an image to be detected to obtain target object prediction information of the object, where the target object prediction information is confidence information that the detected object is the target object; a key point detection module, configured to perform key point detection on the object of the image to be detected to obtain key point prediction information of the object, where the key point prediction information is confidence information that a key point of the detected object is a key point of the target object; a prediction information fusion module, configured to fuse the target object prediction information obtained by the object detection module with the key point prediction information obtained by the key point detection module to obtain comprehensive prediction information of the object; and an object recognition module, configured to recognize the target object according to the comprehensive prediction information obtained by the prediction information fusion module.

Embodiments of the present disclosure provide an apparatus for target object recognition, including: a processor; and a memory for storing instructions executable by the processor. The processor is configured to: perform target object detection on an object of an image to be detected to obtain target object prediction information of the object, wherein the target object prediction information is confidence information that the detected object is a target object; perform key point detection on the object of the image to be detected to obtain key point prediction information of the object, wherein the key point prediction information is confidence information that a key point of the detected object is a key point of the target object; fuse the target object prediction information with the key point prediction information to obtain comprehensive prediction information of the object; and recognize the target object according to the comprehensive prediction information.

Embodiments of the present disclosure provide an electronic device, including: a processor, a memory, a communication element, and a communication bus, where the processor, the memory, and the communication element communicate with each other by means of the communication bus; and the memory is configured to store at least one executable instruction, where the executable instruction causes the processor to execute operations corresponding to any one of the preceding method for target object recognition.

Embodiments of the present disclosure provide a non-transitory computer-readable storage medium having a computer program instruction stored thereon, where the program instruction, when being executed by the processor, implements operations of any one of the preceding method for target object recognition.

Embodiments of the present disclosure provide a computer program including a computer program instruction, where the program instruction, when being executed by a processor, implement operations of any one of the preceding method for target object recognition.

According to a target object recognition solution provided in embodiments of the present disclosure, in the process of performing target object detection on an object of an image to be detected, the target object prediction information of the object is obtained; in the process of performing key point detection on the image to be detected, the key point prediction information of the object is obtained, and the target object prediction information is fused with the key point prediction information; a comprehensive prediction evaluation on the target object is performed on the object of the image to be detected to obtain comprehensive prediction information for indicating that the image to be detected is used for the comprehensive image quality of the target object recognition; and the target object is further recognized according to the comprehensive prediction evaluation result. An image to be detected having a low comprehensive quality can be filtered by means of the preceding comprehensive prediction evaluation, thereby reducing the false positive rate generated when processing the target object. In addition, a high recognition rate can also be ensured by performing comprehensive evaluation on the object of the image to be detected.

DETAILED DESCRIPTION

Exemplary embodiments of the present disclosure are now described in detail with reference to the accompanying drawings.

In the present disclosure, "multiple" may refer to two or more, and "at least one" may refer to one, two or more. Any component, data or structure mentioned in the present disclosure may be understood as one or more if it is not explicitly defined.

Figure 1:
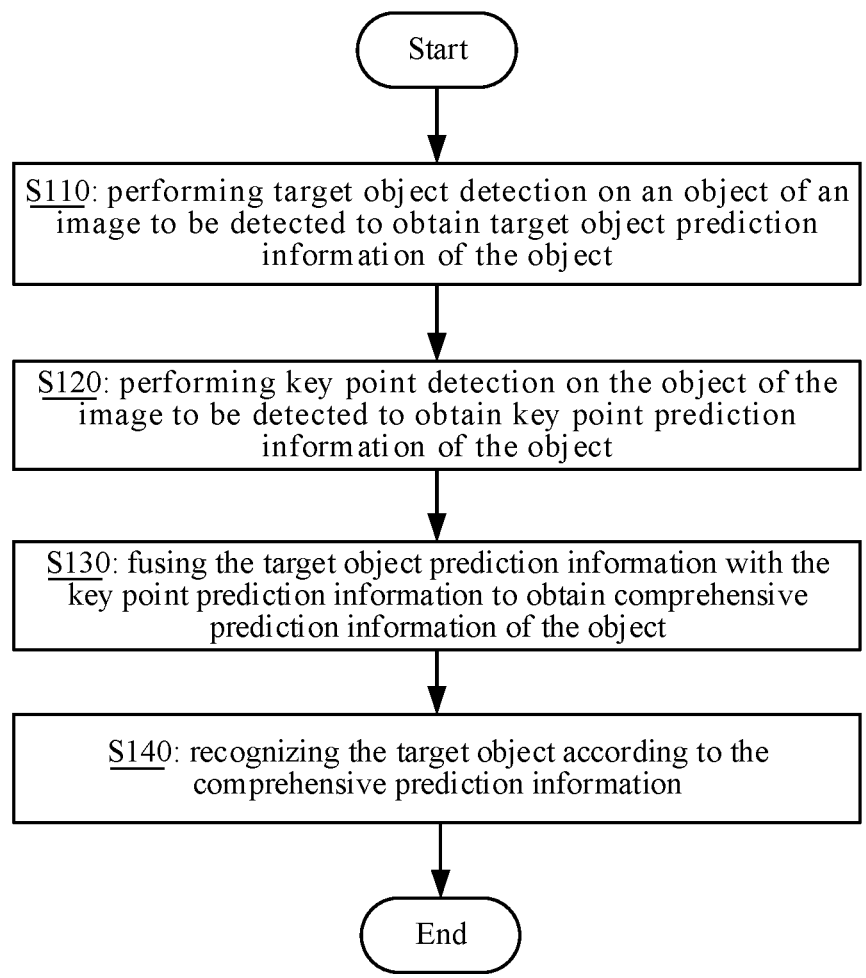
FIG. 1 is a flowchart of a method for target object recognition provided in embodiments of the present disclosure.

FIG. 1 is a flowchart of a method for target object recognition provided in embodiments of the present disclosure.

Referring to FIG. 1, in S110, target object detection is performed on an object of an image to be detected to obtain target object prediction information of the object, where the target object prediction information is confidence information that the detected object is the target object.

The image to be detected herein refers to a photo where one or more objects are photographed, or a video frame image. The image should meet a certain resolution requirement. The photographed object can at least be identified by naked eyes. The target object herein is an object intended to be recognized, and includes but not limited to a face, a pedestrian, a vehicle, a dog, a cat, an ID card, etc.

Target object detection can be performed on an object of an image to be detected by means of any applicable image analysis and processing method so as to detect an image area which may include a target object, from the image to be detected. The image area is a rectangular frame image area which may include the target object, or a preliminarily detected target object-based outline image area.

Multiple objects may exist in an image to be detected, and multiple rectangular frame image areas may also be detected when detecting each target object. Therefore, in the process of detecting the target object, a predictive accuracy of the detected rectangular frame image areas is also evaluated to obtain the target object prediction information. The target object prediction information indicates predictive accuracy information that the detected object is the target object. For example, the target object information indicates the predictive accuracy information that the detected image area is the target object.

The target object prediction information includes but not limited to evaluation score, prediction probability, detection confidence, etc.

In S120, key point detection is performed on the object of the image to be detected to obtain key point prediction information of the object, where the key point prediction information is confidence information that a key point of the detected object is a key point of the target object.

Key point positioning of the target object is preset for any one of target objects intended to be detected. The key point positioning herein includes: detecting an image coordinate of the key point of the target object in an image. For example, in general, five key points are set for a face, i.e., the mouth, the nose, the left eye, the right eye, and the head. 14 key points are set on key positions of the human body for the human body/pedestrian.

Information of the key point of the target object is obtained, by means of any applicable key point positioning method of the image, through detection on the image to be detected. In addition, in the process of detecting the object of the image to be detected, the positioning accuracy of the key point obtained through detection is further evaluated, i.e., the key point prediction information, which indicates the confidence information that the key point of the detected object is a key point of the target object.

The key point prediction information includes but not limited to evaluation score, prediction probability, detection confidence, etc. For detections on multiple key points, evaluation scores for the multiple key points can be averaged to obtain the key point prediction information.

It should be noted here that an execution of S120 is not required to depend on the detection result of S110 due to the existing computer vision technology, i.e., key point detection can be directly performed on the object of the image to be detected when no target object is detected. Therefore, the operations of S110 and S120 can be executed sequentially, the operations of S120 and S110 can be executed sequentially, or the operations of S110 and S120 can be executed concurrently.

In sS130, the target object prediction information is fused with the key point prediction information to obtain the comprehensive prediction information of the object.

The target object prediction information for indicating target object detection, and the key point prediction information for indicating key point alignment can be fused by means of average, summing, or multiplication to obtain the comprehensive prediction information of the detected object.

The comprehensive prediction information is obtained by at least fusing two predictive accuracy indicators, i.e., the target object prediction information for indicating the detection accuracy of the target object, and the key point prediction information for indicating the positioning accuracy of the key point, and the two predictive accuracies will affect the target object recognition result. Therefore, the comprehensive prediction information can be used for indicating that the image to be detected is used for the comprehensive image quality of the target object recognition.

In S140, the target object is recognized according to the comprehensive prediction information.

For example, if the obtained comprehensive prediction information meets a predetermined prediction quality threshold, the target object recognition is continued performing on the object of the image to be detected; otherwise, it can be deduced that the comprehensive prediction quality for the target object detection is not high, and the target object recognition is not performed on the object of the image to be detected, or the target recognition is performed after filtering, clipping, enlarging, and lightening the image to be detected.

For another example, assuming that the image to be detected is a preview image photographed by a camera, and if the determined comprehensive prediction information meets a predetermined prediction quality threshold, the target object is recognized from the image to be detected according to any applicable method for target object recognition.

According to a method for target object recognition in the embodiments of the present disclosure, in the process of performing target object detection on an object of an image to be detected, the target object prediction information of the object is obtained; in the process of performing key point detection on the image to be detected, the key point prediction information of the object is obtained, and the target object prediction information is fused with the key point prediction information; a comprehensive prediction evaluation on the target object is performed on the object of the image to be detected to obtain comprehensive prediction information for indicating that the image to be detected is used for the comprehensive image quality of the target object recognition; and the target object is further recognized according to the comprehensive prediction evaluation result. An image to be detected having a low comprehensive quality can be filtered by means of the preceding comprehensive prediction evaluation, thereby reducing the false positive rate generated when processing the target object. In addition, a high recognition rate can also be ensured by performing comprehensive evaluation on the object of the image to be detected.

Figure 2:
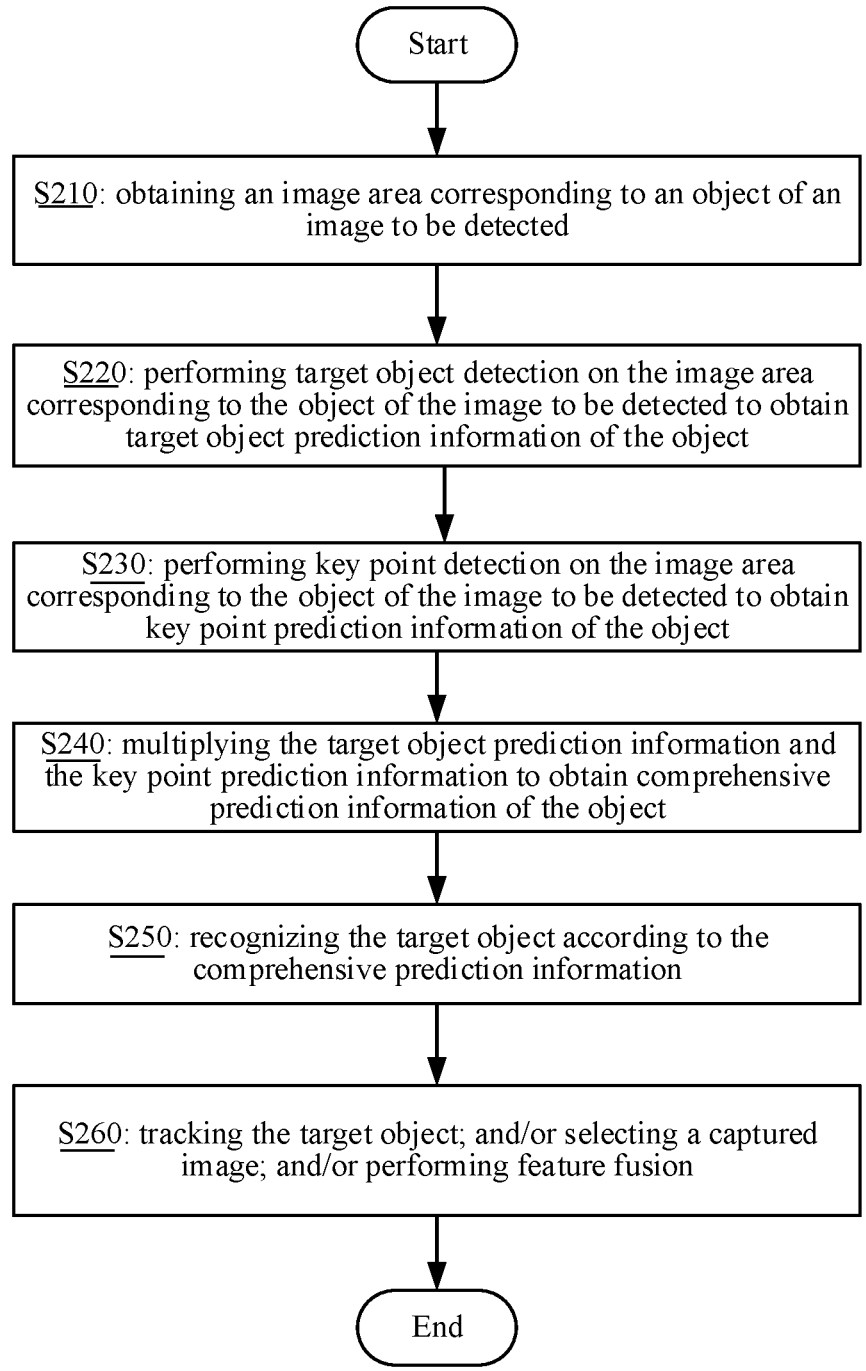
FIG. 2 is a flowchart of a method for target object recognition provided in embodiments of the present disclosure.

FIG. 2 is a flowchart of a method for target object recognition provided in embodiments of the present disclosure.

Referring to FIG. 2, in S210, an image area corresponding to the object of the image to be detected is obtained.

Image areas which may include the target object are detected by means of the used image analysis method, such as an image area of an external rectangle which may include an object.

In S220, the target object detection is performed on the image area corresponding to the object of the image to be detected to obtain the target object prediction information of the object.

After obtaining the image area which may include the target object, the target object detection can be performed on the image area by means of the applicable image analysis method, and the target object prediction information of the object is obtained.

In addition, in some embodiments, the target object can be detected from the image area by means of pre-trained neural networks for object detection, which include but not limited to a region candidate network, a convolutional neural network, etc., and the target object prediction information for indicating the detection accuracy of the target object is obtained so as to improve the recognition rate for object detection.

In S230, the key point detection is performed on the image area corresponding to the object of the image to be detected to obtain the key point prediction information of the object.

Similarly, after obtaining the image area which may include the target object, the key point detection can be performed on the image area to obtain the key point prediction information of the object.

In S240, the target object prediction information and the key point prediction information are multiplied to obtain the comprehensive prediction information of the object.

By multiplying the target object prediction information and the key point prediction information here, the image to be detected having a high predictive accuracy of the target object and a high predictive accuracy of the key point can be highlighted so as to recall in priority the image to be detected having a good comprehensive quality from a target object recognition task. Meanwhile, a high recognition rate can be ensured by adjusting a selection threshold for the comprehensive quality evaluation.

In S250, the target object is recognized according to the comprehensive prediction information. The operation is processed in a similar manner to that in the preceding S140. Details are not described below again.

In S260, any one of the following operations can be executed.

Operation I, the preceding image to be detected is a video frame image in a video frame sequence. The target object is tracked according to a result of recognizing the target object from the multiple video frame images, and the object tracking task is executed on this basis.

Operation II, the image to be detected having the highest comprehensive prediction quality is selected from the multiple images to be detected as a captured image according to the comprehensive prediction information separately obtained for multiple images to be detected. For example, in the photography process, an image having the highest comprehensive prediction quality can be selected from multiple images (preview images) captured in two seconds as a captured image, is stored in the memory, and is represented to a user.

Operation III, the predetermined number of images to be detected is selected from the multiple images to be detected, and the selected image to be detected is performed feature fusion according to the comprehensive prediction information separately obtained for the multiple images to be detected. The fused image feature data can be further used for the detected or processed task.

It should be understood that the preceding descriptions are merely several exemplary processing for the target object on the object of the image to be detected, which can be used for any task processing task.

According to the method for target object recognition in the embodiments of the present disclosure, first, the image area corresponding to the object of the image to be detected is obtained, and then the target object detection and the key point detection are performed on the image area to obtain the target object prediction information and the key point prediction information of the object; and the target object prediction information and the key point prediction information are multiplied to obtain the comprehensive prediction information of the object. In addition, after recognizing the target object according to the comprehensive prediction information, processing can be further executed such as target object tracking, captured image selection, and image feature fusion so as to better execute other image processing tasks associated with the target object based on the comprehensive image quality evaluation.

Figure 3:
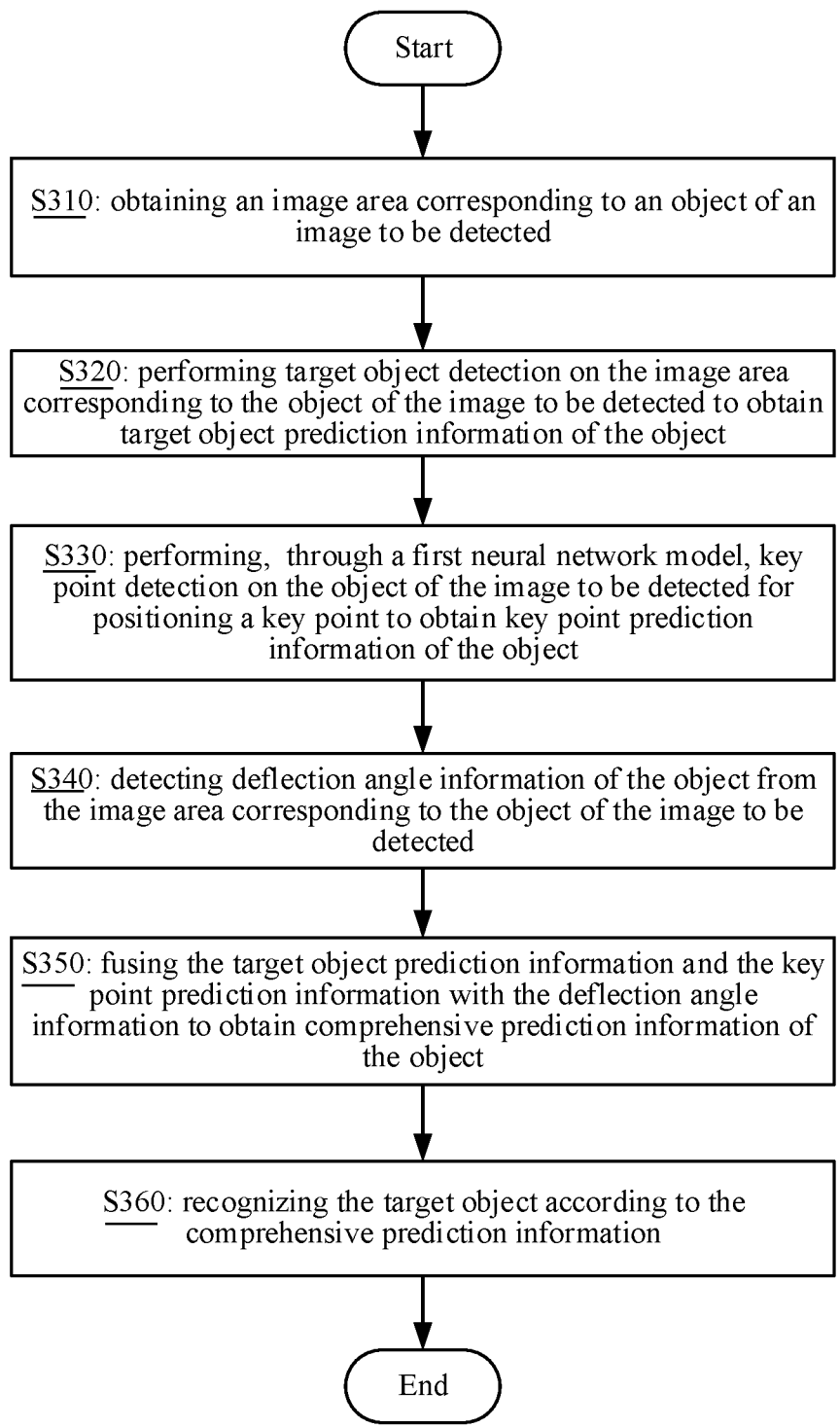
FIG. 3 is a flowchart of a method for target object recognition provided in embodiments of the present disclosure.

FIG. 3 is a flowchart of a method for target object recognition provided in embodiments of the present disclosure.

Referring to FIG. 3, in S310, an image area corresponding to the object of the image to be detected is obtained.

In S320, the target object detection is performed on the image area corresponding to the object of the image to be detected to obtain the target object prediction information of the object.

In S330, a first neural network model for positioning a key point is used for performing key point detection on the object of the image to be detected to obtain the key point prediction information of the object.

In some embodiments, a first pre-trained neural network model for performing key point positioning on an object candidate frame is used for directly performing key point detection on the obtained image area to obtain the key point of the object and the corresponding key point prediction information.

According to another embodiment of the present disclosure, a first neural network model for positioning the key point of the image to be detected is used for obtaining the key point of the object and the corresponding key point prediction information from the image to be detected. That is to say, the image area corresponding to the image to be detected instead of the object can be used as an input of the first neural network model to first detect the key point of the image to be detected.

Subsequently, in S340, deflection angle information of the object is detected from the image area corresponding to the object of the image to be detected.

In general, a deflection angle of the object is also detected in the target object detection process. Therefore, the deflection angle information of the object can be detected by means of processing in S340.

The deflection angle can include a horizontal deflection angle (a yaw angle), and can also include a vertical deflection angle (a pitch angle), or a horizontal deflection angle (a yaw angle) and a vertical deflection angle (a pitch angle).

For example, a second neural network model for object classification is used for detecting the object and obtaining the deflection angle information thereof from the image area corresponding to the object of the image to be detected. The second neural network model for detecting the deflection angle information of the object can be pre-trained. The deflection angle information can also be obtained by means of other image analysis methods.

In S350, the target object prediction information and the key point prediction information are fused with the deflection angle information to obtain the comprehensive prediction information of the object.

The deflection angle of a non-front object generally affects the target object recognition effect. Therefore, the deflection angle information of the object is also used as one of image quality evaluation indicators.

Similar to the processing in the preceding S130, the target object prediction information for indicating the detection accuracy of the target object, and the key point prediction information for indicating the positioning accuracy of the key point are fused with the deflection angle information of the object by means of average, summing, multiplication, etc. to obtain the comprehensive prediction information of the object.

In S360, the target object is recognized according to the comprehensive prediction information.

On this basis, in some embodiments, the processing in the preceding S260 can be continued performing.

According to the method for target object recognition in any embodiment of the present disclosure, the deflection angle information of the object detected from the image area corresponding to the object of the image to be detected is also used as one of evaluation indicators, and is fused with the preceding target object prediction information and key point prediction information to perform the comprehensive quality evaluation associated with the target object recognition, on the object of the image to be detected, and the target object is further recognized according to the comprehensive prediction evaluation result. This method helps affecting the target object recognition to evaluate the comprehensive image quality and filter the image to be detected having a low comprehensive quality so as to reduce the false positive rate generated when recognizing the target object and ensure a high recognition rate, thereby more accurately executing a target object recognition task.

Figure 4:
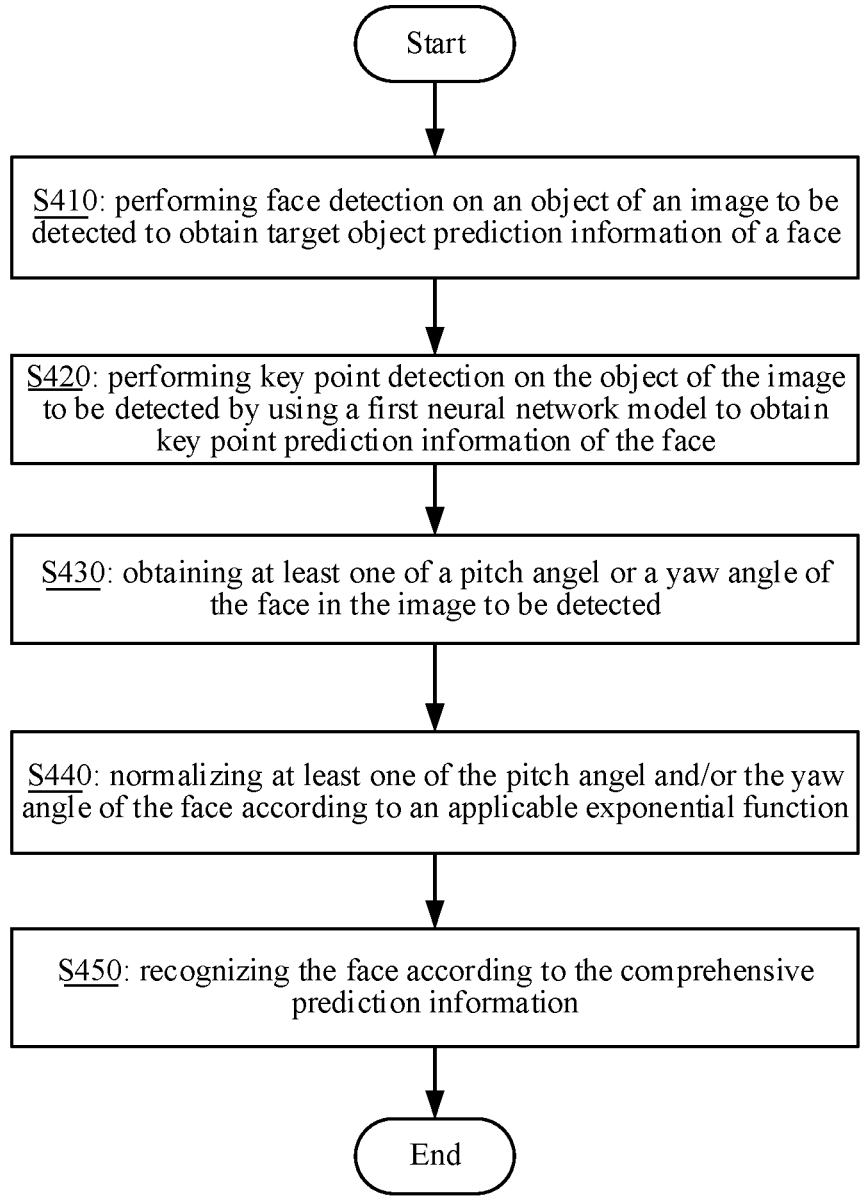
FIG. 4 is a flowchart of a method for target object recognition provided in embodiments of the present disclosure.

FIG. 4 is a flowchart of a method for target object recognition provided in embodiments of the present disclosure.

In this embodiment, an example of using the target object as a face is taken for describing processing of the method for target object recognition.

Referring to FIG. 4, in S410, face detection is performed on the object of the image to be detected, and the target object prediction information of the face is obtained.

The face detection can be performed on the object of the image to be detected by means of any applicable face detection method, and the target object prediction information of the face is obtained.

In S420, a first neural network model for positioning a key point is used for performing key point detection on the object of the image to be detected to obtain the key point prediction information of the face.

In S430, a pitch angel of the face and/or a yaw angle of the face in the image to be detected is obtained.

The pitch angel refers to a face deflection angle by using the horizontal direction as a shaft. The yaw angle refers to a face deflection angle by using the vertical direction as a shaft.

In general, the value range of the pitch angel and the yaw angle of the face is from −90 degrees to +90 degrees.

In some embodiments, the face is detected and the pitch angel and/or the yaw angle of the face is obtained from the detected face image area by means of the preceding second neural network model.

In this operation, any one of or both of the pitch angel and the yaw angle of the face can be obtained for subsequent processing.

In S440, the pitch angel and/or the yaw angle is normalized according to an applicable exponential function.

For example, the pitch angel is normalized by the exponential function exp(−10×a pitch angel×a pitch angel/8100). Similarly, the yaw angle is normalized by the exponential function exp(−10×a yaw angle×a yaw angle/8100). Or, the pitch angel and the yaw angle are normalized by simply using formulas |a pitch angel/90| and |a yaw angle value/90|, separately. Subsequently, the normalized pitch angel and yaw angle are fused, e.g., multiplied, to generate angle evaluation information of the target object.

In S450, the comprehensive prediction information of the object is obtained by one of the following operations:

multiplying the target object prediction information, the key point prediction information, and the normalized pitch angle of the face to obtain the comprehensive prediction information of the object;

or, multiplying the target object prediction information, the key point prediction information, and the normalized yaw angle to obtain the comprehensive prediction information of the object;

or, multiplying the target object prediction information, the key point prediction information, the normalized pitch angle of the face, and the normalized yaw angle of the face to obtain the comprehensive prediction information of the object.

That is to say, any one or both of the normalized pitch angle and the normalized yaw angle of the face can be fused with the target object prediction information and the key point prediction information according to the face recognition task requirement to obtain the comprehensive prediction information of the object.

For example, if the obtained comprehensive prediction information meets a predetermined prediction quality threshold, the face recognition is continued performing on the object of the image to be detected by means of an applicable face recognition method.

In addition, any existing network training method can be used for pre-training neural networks for object detection, the first neural network model for positioning the key point, and/or the second neural network model for object classification. A supervised-based learning method, an unsupervised method, a reinforcement learning method, or a semi-supervised method can be used for pre-training the preceding neural network models according to functions to be implemented, features, and training requirements.

According to the method for target object recognition in the embodiments of the present disclosure, on the basis of the preceding embodiments, the key point positioning of the face, the deflection angle detection thereof, etc. can be performed by means of the pre-trained models to ensure the face detection accuracy, the obtained target object prediction and key point prediction are fused with the normalized pitch angle and/or the normalized yaw angle of the face to obtain comprehensive quality data associated with the face recognition, and the face is further recognized according to the comprehensive prediction evaluation result. This method helps affecting the face recognition to evaluate the comprehensive image quality and filter the image to be detected having a low comprehensive quality so as to reduce the false positive rate generated when recognizing the face and ensure a high recognition rate, thereby more accurately executing a face recognition task.

Figure 5:
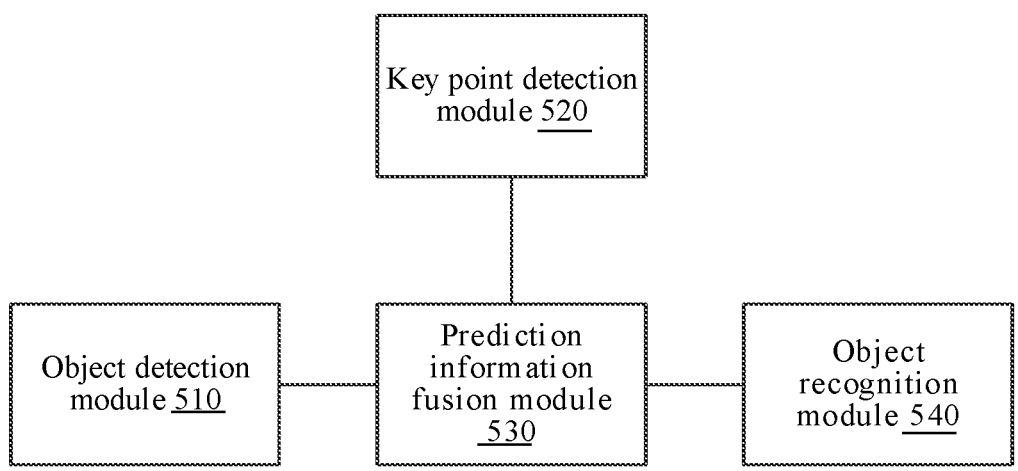
FIG. 5 is a logic block diagram of an apparatus for target object recognition provided in embodiments of the present disclosure.

Referring to FIG. 5, a target object recognition apparatus includes: an object detection module 510, a key point detection module 520, a prediction information fusion module 530 and an object recognition module 540. The above modules in FIG. 5 may be implemented by a processor by executing corresponding instructions stored in a memory.

The object detection module 510 is configured to perform target object detection on an object of an image to be detected to obtain target object prediction information of the object, where the target object prediction information is confidence information that the detected object is the target object.

The key point detection module 520 is configured to perform key point detection on the object of the image to be detected to obtain key point prediction information of the object, where the key point prediction information is confidence information that a key point of the detected object is a key point of the target object;

The prediction information fusion module 530 is configured to fuse the target object prediction information obtained by the object detection module 510 with the key point prediction information obtained by the key point detection module 520 to obtain comprehensive prediction information of the object; and The object recognition module 540 is configured to recognize the target object according to the comprehensive prediction information obtained by the prediction information fusion module.

The target object recognition apparatus of this embodiment is configured to implement the corresponding method for target object recognition in the forgoing method embodiment, and has the beneficial effects of the corresponding method embodiment. Details are not described below again.

Figure 6:
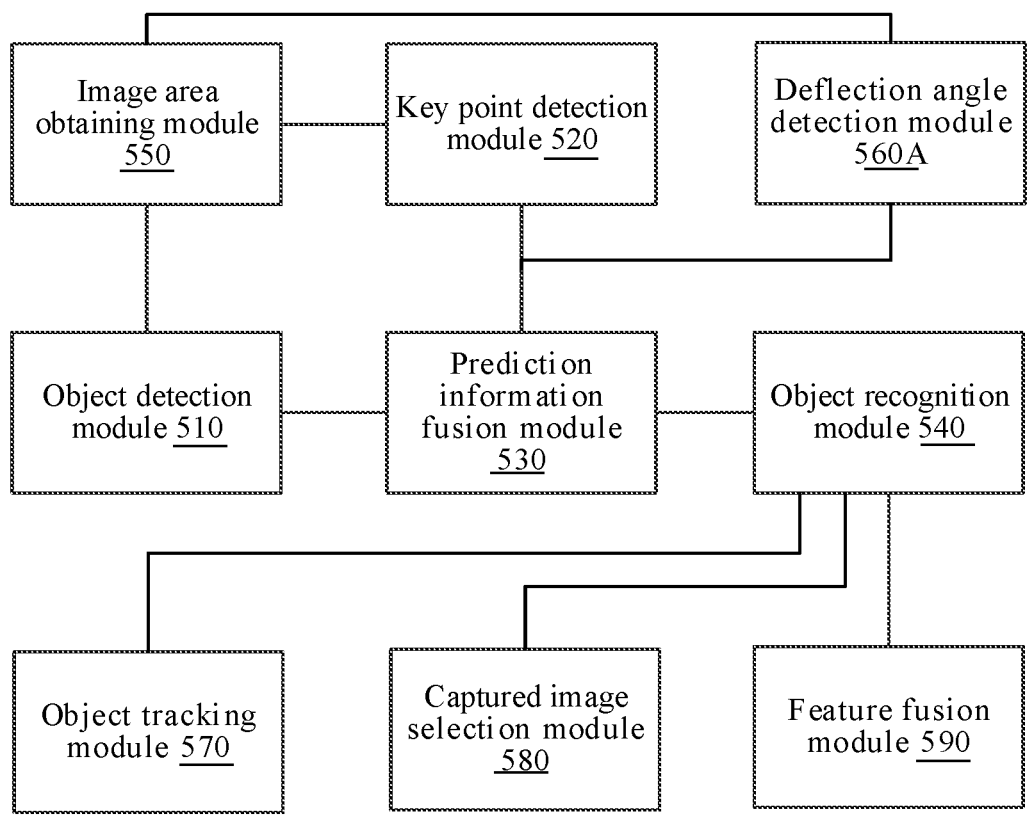
FIG. 6 is a logic block diagram of an apparatus for target object recognition provided in embodiments of the present disclosure.

Referring to FIG. 6, in addition to the preceding object detection module 510, key point detection module 520, prediction information fusion module 530, and object recognition module 540, the target object recognition apparatus provided in this embodiment further includes an image area obtaining module 550. The above modules in FIG. 6 may be implemented by a processor by executing corresponding instructions stored in a memory.

The image area obtaining module 550 is configured to obtain the image area corresponding to the object of the image to be detected. Accordingly, the object detection module 510 is configured to perform target object detection on the image area corresponding to the object of the image to be detected, obtained by the image area obtaining module 550. The key point detection module 520 is configured to perform key point detection on the image area corresponding to the object of the image to be detected, obtained by the image area obtaining module 550.

In some embodiments, the prediction information fusion module 530 is configured to multiply the target object prediction information and the key point prediction information to obtain the comprehensive prediction information of the object.

In some embodiments, the key point detection module 520 is configured to perform key point detection on the object of the image to be detected by using the neural network model for positioning the key point to obtain the key point prediction information of the object.

In some embodiments, after the obtaining the image area corresponding to the object of the image to be detected, and before the fusing the target object prediction information with the key point prediction information to obtain the comprehensive prediction information of the object, the apparatus further includes: a deflection angle detection module 560A, configured to detect the deflection angle information of the object from the image area obtained by the image area obtaining module 550. Accordingly, the prediction information fusion module 530 is configured to fuse the target object prediction information and the key point prediction information with the deflection angle information to obtain the comprehensive prediction information of the object.

In some embodiments, the deflection angle detection module 560A is configured to detect the deflection angle information of the object from the image area by using the neural network model for object classification.

In some embodiments, the image to be detected is a video frame image. After recognizing the target object according to the comprehensive prediction information, the apparatus further includes:

an object tracking module 570, configured to track the target object according to a result of recognizing the target object from the multiple video frame images;

or, a captured image selection module 580, configured to select a video frame image having the highest comprehensive prediction quality from the multiple video frame images as a captured image according to the comprehensive prediction information separately obtained for the multiple video frame images;

or, a feature fusion module 590, configured to select the predetermined number of video frame images from the multiple video frame images according to the comprehensive prediction information separately obtained for the multiple video frame images, and perform feature fusion on the selected video frame images.

According to the embodiments of the present disclosure, the target object can be the face.

Figure 7:
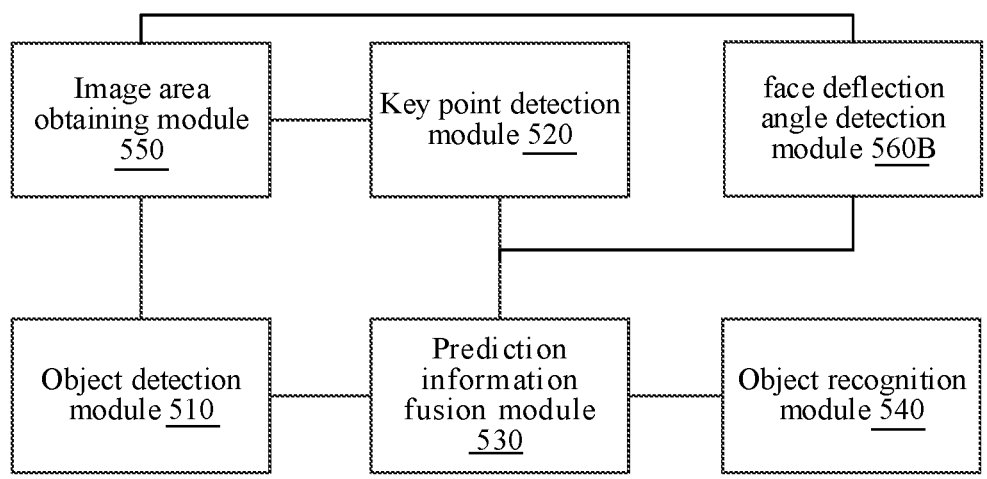
FIG. 7 is a logic block diagram of an apparatus for target object recognition provided in embodiments of the present disclosure.

Referring to FIG. 7, in addition to the preceding object detection module 510, key point detection module 520, prediction information fusion module 530, object recognition module 540, and image area obtaining module 550, the target object recognition apparatus further includes a face deflection angle detection module 560B. The above modules in FIG. 7 may be implemented by a processor by executing corresponding instructions stored in a memory.

Before the prediction information fusion module 530 fuses the target object prediction information with the key point prediction information to obtain the comprehensive prediction information of the object, the face deflection angle detection module 560B is configured to detect the pitch angle and/or the yaw angle of the face from the image area obtained by the image area obtaining module 550.

Accordingly, the prediction information fusion module 530 is configured to:

normalize the pitch angle and/or the yaw angle of the face according to the applicable exponential function; and multiply the target object prediction information, the key point prediction information, and the normalized pitch angle of the face to obtain the comprehensive prediction information of the object;

or, multiply the target object prediction information, the key point prediction information, and the normalized yaw angle to obtain the comprehensive prediction information of the object;

or, multiply the target object prediction information, the key point prediction information, the normalized pitch angle of the face, and the normalized yaw angle of the face to obtain the comprehensive prediction information of the object.

In some embodiments, the target object recognition apparatus further includes the object tracking module 570, the captured image selection module 580, or the feature fusion module 590.

The target object recognition apparatus of this embodiment is configured to implement the corresponding method for target object recognition in the forgoing method embodiment, and has the beneficial effects of the corresponding method embodiment. Details are not described below again.

The embodiments of the present disclosure provide a computer-readable storage medium having computer program instructions stored thereon, where when the program instructions are executed by a processor, operations of the method for target object recognition according to any one of the preceding embodiments are implement, and has the beneficial effects of the corresponding embodiments. Details are not described below again.

Figure 8:
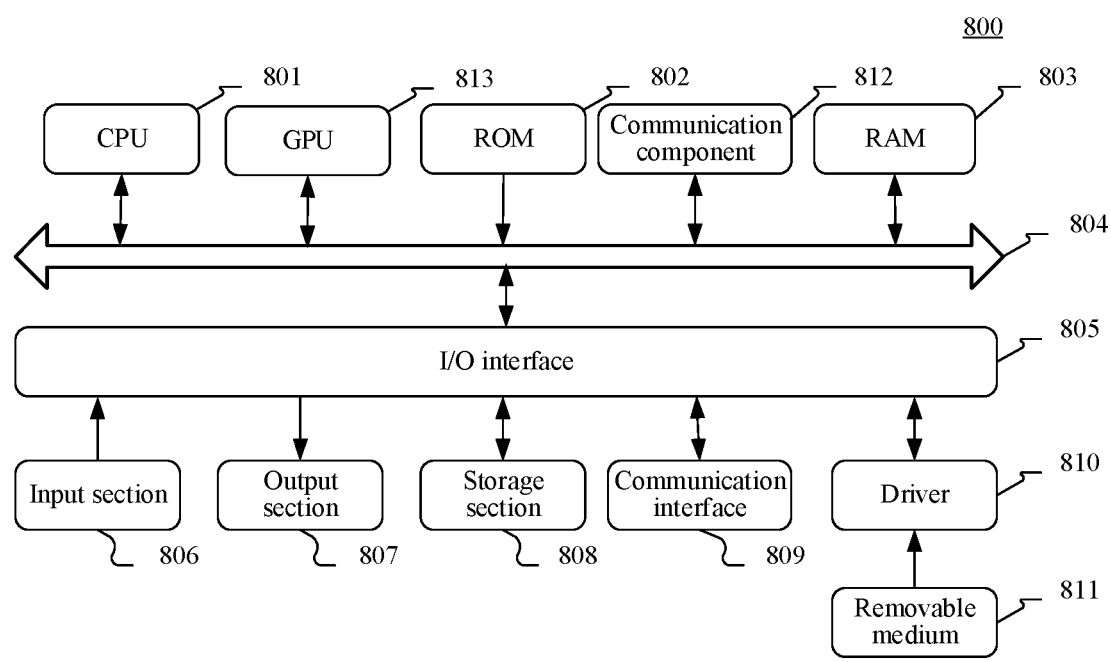
FIG. 8 is a schematic structural diagram of an electronic device provided in embodiments of the present disclosure.

The embodiments of the present disclosure provide an electronic device, which, for example, is a mobile terminal, a Personal Computer (PC), a tablet computer, a server, or the like. Referring to FIG. 8 below, a schematic structural diagram of an electronic device 800 adapted to implement a terminal device or a server according to the embodiments of the present disclosure is shown.

As shown in FIG. 8, the electronic device 800 includes one or more processors, a communication element, and the like. The one or more processors are, for example, one or more Central Processing Units (CPUs) 801 and/or one or more Graphic Processing Units (GPUs) 813, and may execute appropriate actions and processing according to executable instructions stored in a Read-Only Memory (ROM) 802 or executable instructions loaded from a storage section 808 to a Random Access Memory (RAM) 803. The communication element includes a communication component 812 and a communication interface 809. The communication component 812 may include, but not limited to, a network card. The network card may include, but not limited to, an InfiniBand (IB) network card. The communication interface 809 includes a communication interface of a network interface card such as an LAN card and a modem, and the communication interface 809 performs communication processing via a network such as the Internet.

The processor communicates with the ROM 802 and/or the RAM 803 to execute executable instructions, is connected to the communication component 812 by means of the bus 804, and communicates with other target devices via the communication component 812, so as to complete operations corresponding to any method provided in the embodiments of the present disclosure, such as performing target object detection on the object of the image to be detected to obtain the target object prediction information of the object, where the target object prediction information is confidence information that the detected object is the target object; performing key point detection on the object of the image to be detected to obtain the key point prediction information of the object, where the key point prediction information is confidence information that a key point of the detected object is a key point of the target object; fusing the target object prediction information with the key point prediction information to obtain the comprehensive prediction information of the object; and recognizing the target object according to the comprehensive prediction information.

In addition, the RAM 803 further stores various programs and data required for operations of an apparatus. The CPU 801, the ROM 802, and the RAM 803 are connected to each other via the bus 804. In the case that the RAM 803 exists, the ROM 802 is an optional module. The RAM 803 stores executable instructions, or writes the executable instructions to the ROM 802 during running, where the executable instructions enable the processor 801 to perform operations corresponding to the preceding communication method. An Input/Output (I/O) interface 805 is also connected to the bus 804. The communication component 812 may be integrated, or may be configured to have multiple sub-modules (for example, multiple IB network cards) linked on the bus.

The following components are connected to the I/O interface 805: an input section 806 including a keyboard, a mouse and the like; an output section 807 including a Cathode-Ray Tube (CRT), a Liquid Crystal Display (LCD), a loudspeaker and the like; a storage section 808 including hardware and the like; and the communication interface 809 of a network interface card including an LAN card, a modem and the like. A drive 810 is also connected to the I/O interface 805 according to requirements. A removable medium 811 such as a magnetic disk, an optical disk, a magneto-optical disk, a semiconductor memory or the like is mounted on the drive 810 according to requirements, so that a computer program read from the removable medium is installed on the storage section 808 according to requirements.

It should be noted that the architecture illustrated in FIG. 8 is merely an optional implementation mode. During specific practice, the number and types of the components in FIG. 8 may be selected, decreased, increased, or replaced according to actual requirements. Different functional components may be separated or integrated or the like. For example, the GPU and the CPU may be separated, or the GPU may be integrated on the CPU, and the communication element 812 may be separated from or integrated on the CPU or the GPU or the like. These alternative implementations all fall within the scope of protection of the present disclosure.

Particularly, the process described above with reference to the flowchart according to the embodiments of the present disclosure is implemented as a computer software program. For example, the embodiments of the present disclosure include a computer program product, which includes a computer program tangibly included in a machine-readable medium. The computer program includes a program code for executing a method shown in the flowchart. The program code may include corresponding instructions for correspondingly executing operations of the methods provided by the embodiments of the present disclosure, such as an executable code for performing target object detection on the object of the image to be detected to obtain the target object prediction information of the object, where the target object prediction information is confidence information that the detected object is the target object; an executable code for performing key point detection on the object of the image to be detected to obtain the key point prediction information of the object, where the key point prediction information is confidence information that a key point of the detected object is a key point of the target object; an executable code for fusing the target object prediction information with the key point prediction information to obtain the comprehensive prediction information of the object; and an executable code for recognizing the target object according to the comprehensive prediction information. In such embodiments, the computer program may be downloaded from a network by means of the communication element and installed, and/or be installed from the removable medium 811. The computer program, when being executed by the CPU 801, executes the preceding functions defined in the method of the embodiments of the present disclosure. For the term "and/or" throughout the present disclosure, the symbol "/" refers to "or," for example, "A and/or B" including "A," "B," and "A and B."

According to an electronic device further provided in the embodiments of the present disclosure, in the process of performing target object detection on an object of an image to be detected, the target object prediction information of the object is obtained; in the process of performing key point detection on the image to be detected, the key point prediction information of the object is obtained, and the target object prediction information is fused with the key point prediction information; a comprehensive prediction evaluation on the target object is performed on the object of the image to be detected to obtain comprehensive prediction information for indicating that the image to be detected is used for the comprehensive image quality of the target object recognition; and the target object is further recognized according to the comprehensive prediction evaluation result. An image to be detected having a low comprehensive quality can be filtered by means of the preceding comprehensive prediction evaluation, thereby reducing the false positive rate generated when processing the target object. In addition, a high recognition rate can also be ensured by performing comprehensive evaluation on the object of the image to be detected.

It should be noted that according to needs for implementation, the parts/operations described in the present disclosure are separated into more parts/operations, and two or more parts/operations or some operations of the parts/operations are also combined into new parts/operations to achieve the purpose of the embodiments of the present disclosure.

The methods, apparatuses, and devices in the present disclosure are implemented in many manners. For example, the methods, apparatuses, and devices in the embodiments of the present disclosure are implemented with software, hardware, firmware, or any combination of software, hardware, and firmware. Unless otherwise specially stated, the preceding sequences of operations of the methods are merely for description, and are not intended to limit the operations of the methods of the embodiments of the present disclosure. In addition, in some embodiments, the present disclosure may be implemented as programs recorded in a recording medium. The programs include machine-readable instructions for implementing the methods according to the embodiments of the present disclosure. Therefore, the present disclosure further covers the recording medium storing the programs for performing the methods according to the present disclosure.

The descriptions of the embodiments of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A method for target object recognition, comprising:
obtaining an image area corresponding to an object of an image to be detected;
performing target object detection on the image area corresponding to the object of the image to be detected to obtain target object prediction information of the object, wherein the target object prediction information is confidence information that the detected object is a target object;
performing key point detection on the image area corresponding to the object of the image to be detected to obtain key point prediction information of the object, wherein the key point prediction information is confidence information that a key point of the detected object is a key point of the target object;
fusing the target object prediction information with the key point prediction information to obtain comprehensive prediction information of the object; and
recognizing the target object according to the comprehensive prediction information,
wherein after obtaining the image area corresponding to the object of the image to be detected, and before fusing the target object prediction information with the key point prediction information to obtain the comprehensive prediction information of the object, the method further comprises:

detecting deflection angle information of the object from the image area; and the fusing the target object prediction information with the key point prediction information to obtain the comprehensive prediction information of the object comprises:

fusing the target object prediction information and the key point prediction information with the deflection angle information to obtain comprehensive prediction information of the object.

2. The method according to claim 1, wherein the fusing the target object prediction information with the key point prediction information to obtain the comprehensive prediction information of the object comprises:

multiplying the target object prediction information and the key point prediction information to obtain the comprehensive prediction information of the object.

3. The method according to claim 1, wherein the performing key point detection on the object of the image to be detected to obtain the key point prediction information of the object comprises:

performing, through a neural network model for positioning a key point, key point detection on the object of the image to be detected to obtain the key point prediction information of the object.

4. The method according to claim 1, wherein the detecting deflection angle information of the object from the image area comprises:

detecting the deflection angle information of the object from the image area by using a neural network model for object classification.

5. The method according to claim 1, wherein
the target object is a face;
before fusing the target object prediction information with the key point prediction information to obtain the comprehensive prediction information of the object, the method further comprises:

detecting at least one of a pitch angle of the face or a yaw angle of the face from the image area;

the fusing the target object prediction information with the key point prediction information to obtain the comprehensive prediction information of the object comprises:

normalizing at least one of the pitch angle of the face or the yaw angle of the face according to an applicable exponential function; and multiplying the target object prediction information, the key point prediction information, and the normalized pitch angle of the face to obtain the comprehensive prediction information of the object;

or, multiplying the target object prediction information, the key point prediction information, and the normalized yaw angle of the face to obtain the comprehensive prediction information of the object;

or, multiplying the target object prediction information, the key point prediction information, the normalized pitch angle of the face, and the normalized yaw angle of the face to obtain the comprehensive prediction information of the object.

6. The method according to claim 1, wherein the image to be detected is a video frame image;

after recognizing the target object according to the comprehensive prediction information, the method further comprising:

tracking the target object according to a result of recognizing the target object from multiple video frame images;

or, select a video frame image having the highest comprehensive prediction quality from the multiple video frame images as a captured image according to comprehensive prediction information separately obtained for the multiple video frame images;

or, selecting a predetermined number of video frame images from the multiple video frame images according to the comprehensive prediction information separately obtained for the multiple video frame images, and performing feature fusion on the selected video frame images.

7. An apparatus for target object recognition, comprising:
a processor; and
a memory for storing instructions executable by the processor;
wherein the processor is configured to:
obtain an image area corresponding to an object of an image to be detected;
perform target object detection on the image area corresponding to the object of the image to be detected to obtain target object prediction information of the object, wherein the target object prediction information is confidence information that the detected object is a target object;
perform key point detection on the image area corresponding to the object of the image to be detected to obtain key point prediction information of the object, wherein the key point prediction information is confidence information that a key point of the detected object is a key point of the target object;
fuse the target object prediction information with the key point prediction information to obtain comprehensive prediction information of the object; and
recognize the target object according to the comprehensive prediction information,
wherein after obtaining the image area corresponding to the object of the image to be detected, and before fusing the target object prediction information with the key point prediction information to obtain the comprehensive prediction information of the object, the processor is further configured to:
detect deflection angle information of the object from the image area; and
the processor is specifically configured to: fuse the target object prediction information and the key point prediction information with the deflection angle information to obtain the comprehensive prediction information of the object.

8. The apparatus according to claim 7, wherein the processor is configured to multiply the target object prediction information and the key point prediction information to obtain the comprehensive prediction information of the object.

9. The apparatus according to claim 7, wherein the processor is configured to perform, using a neural network model for positioning the key point, key point detection on the object of the image to be detected to obtain the key point prediction information of the object.

10. The apparatus according to claim 7, wherein the processor is configured to detect the deflection angle information of the object from the image area by using the neural network model for object classification.

11. The apparatus according to claim 7, wherein
the target object is a face;
before the fusing the target object prediction information with the key point prediction information to obtain comprehensive prediction information of the object, the processor is further configured to:
detect at least one of a pitch angle of the face or a yaw angle of the face from the image area; and
normalize the at least one of the pitch angle of the face or the yaw angle of the face according to the applicable exponential function; and
multiply the target object prediction information, the key point prediction information, and the normalized pitch angle of the face to obtain the comprehensive prediction information of the object;
or,
multiply the target object prediction information, the key point prediction information, and the normalized yaw angle to obtain the comprehensive prediction information of the object;
or,
multiply the target object prediction information, the key point prediction information, the normalized pitch angle of the face, and the normalized yaw angle of the face to obtain the comprehensive prediction information of the object.

12. The apparatus according to claim 7, wherein the image to be detected is a video frame image;
after the recognizing the target object according to the comprehensive prediction information, the processor is further configured to:
track the target object according to a result of recognizing the target object from the multiple video frame images;
or,
select a video frame image having the highest comprehensive prediction quality from the multiple video frame images as a captured image according to the comprehensive prediction information separately obtained for the multiple video frame images;
or,
select the predetermined number of video frame images from the multiple video frame images according to the comprehensive prediction information separately obtained for the multiple video frame images, and perform feature fusion on the selected video frame images.

13. A non-transitory computer-readable storage medium, having computer program instructions stored thereon, wherein the program instructions, when being executed by a processor, implement a method for target object recognition, the method comprising:
obtaining an image area corresponding to an object of an image to be detected;
performing target object detection on the image area corresponding to the object of the image to be detected to obtain target object prediction information of the object, wherein the target object prediction information is confidence information that the detected object is a target object;
performing key point detection on the image area corresponding to the object of the image to be detected to obtain key point prediction information of the object, wherein the key point prediction information is confidence information that a key point of the detected object is a key point of the target object;
fusing the target object prediction information with the key point prediction information to obtain comprehensive prediction information of the object; and
recognizing the target object according to the comprehensive prediction information,
wherein after obtaining the image area corresponding to the object of the image to be detected, and before fusing the target object prediction information with the key point prediction information to obtain the comprehensive prediction information of the object, the method further comprises:
detecting deflection angle information of the object from the image area; and
the fusing the target object prediction information with the key point prediction information to obtain the comprehensive prediction information of the object comprises:
fusing the target object prediction information and the key point prediction information with the deflection angle information to obtain comprehensive prediction information of the object.

14. The non-transitory computer-readable storage medium according to claim 13, wherein the fusing the target object prediction information with the key point prediction information to obtain the comprehensive prediction information of the object comprises:
multiplying the target object prediction information and the key point prediction information to obtain the comprehensive prediction information of the object.

15. The non-transitory computer-readable storage medium according to claim 13, wherein the performing key point detection on the object of the image to be detected to obtain the key point prediction information of the object comprises:
performing, using a neural network model for positioning a key point, key point detection on the object of the image to be detected to obtain the key point prediction information of the object.

16. The non-transitory computer-readable storage medium according to claim 13, wherein the detecting deflection angle information of the object from the image area comprises:
detecting the deflection angle information of the object from the image area by using a neural network model for object classification.

17. The non-transitory computer-readable storage medium according to claim 13, wherein
the target object is a face;
before fusing the target object prediction information with the key point prediction information to obtain the comprehensive prediction information of the object, the method further comprises:
detecting at least one of a pitch angle of the face or a yaw angle of the face from the image area;
the fusing the target object prediction information with the key point prediction information to obtain the comprehensive prediction information of the object comprises:
normalizing at least one of the pitch angle of the face or the yaw angle of the face according to an applicable exponential function; and
multiplying the target object prediction information, the key point prediction information, and the normalized pitch angle of the face to obtain the comprehensive prediction information of the object;

or,
multiplying the target object prediction information, the key point prediction information, and the normalized yaw angle of the face to obtain the comprehensive prediction information of the object;

or,
multiplying the target object prediction information, the key point prediction information, the normalized pitch angle of the face, and the normalized yaw angle of the face to obtain the comprehensive prediction information of the object.

* * * * *